United States Patent [19]

Linton

[11] 4,133,286

[45] Jan. 9, 1979

[54] ADJUSTABLE THERMOSTAT

[75] Inventor: Jonathan L. Linton, Mansfield, Ohio

[73] Assignee: Therm-O-Disc Incorporated, Mansfield, Ohio

[21] Appl. No.: 771,528

[22] Filed: Feb. 24, 1977

[51] Int. Cl.² .................... G01D 13/22; G05D 23/00
[52] U.S. Cl. ................................ 116/313; 116/216; 236/94
[58] Field of Search ............... 116/124 L, 124.2 A, 116/124.2 R, 124 A, 114 Y; 74/527, 528, 531; 200/336, 329, 236; 337/349; 73/363

[56] References Cited

U.S. PATENT DOCUMENTS

| | | | |
|---|---|---|---|
| 3,045,498 | 7/1962 | Viezzoli | 74/527 X |
| 3,149,638 | 9/1964 | Small | 74/527 X |
| 3,442,129 | 5/1969 | Odson | 73/363 |
| 3,477,299 | 11/1969 | Speer et al. | 74/527 X |
| 3,602,863 | 8/1971 | Place | 337/349 |
| 3,769,933 | 11/1973 | Fox | 116/124.2 A |
| 3,877,217 | 4/1975 | Hochstrate | 74/527 X |
| 3,929,093 | 12/1975 | Ikeda | 116/124.2 R |
| 4,029,043 | 6/1977 | Nothdurft | 116/124 A |

Primary Examiner—Daniel M. Yasich
Attorney, Agent, or Firm—McNenny, Pearne, Gordon, Gail, Dickinson & Schiller

[57] ABSTRACT

An adjustable thermostat as disclosed having an adjustment stem journaled for rotation on the thermostat body for adjusting the operating temperature of the thermostat. Mounted on the adjusting stem is a pointer member formed of deformable material such as Nylon and providing a peripheral surface which engages with interference stationary surfaces on the thermostat body. Interengagement is provided between the peripheral surface and the stationary surfaces which causes deformation of the pointer member and creates friction resisting rotation of the pointer and of the adjusting stem. A detent-like structure is provided by flats formed on the peripheral surface of the pointer which mate with the corresponding surfaces of the body to tend to lock the pointer and in turn adjusting stem at a predetermined temperature.

11 Claims, 4 Drawing Figures

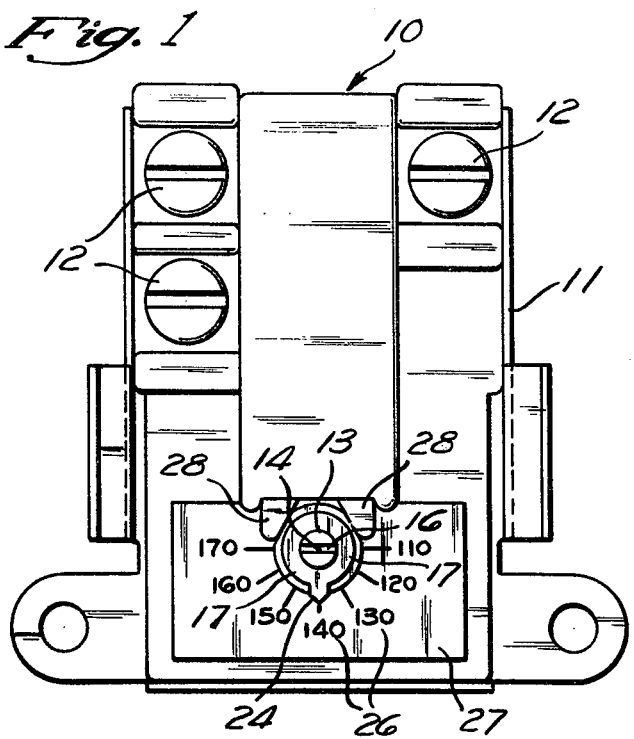
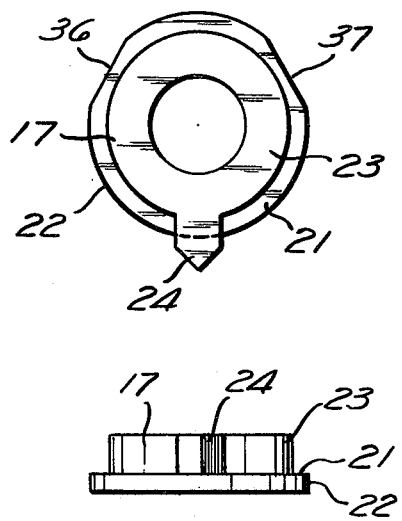
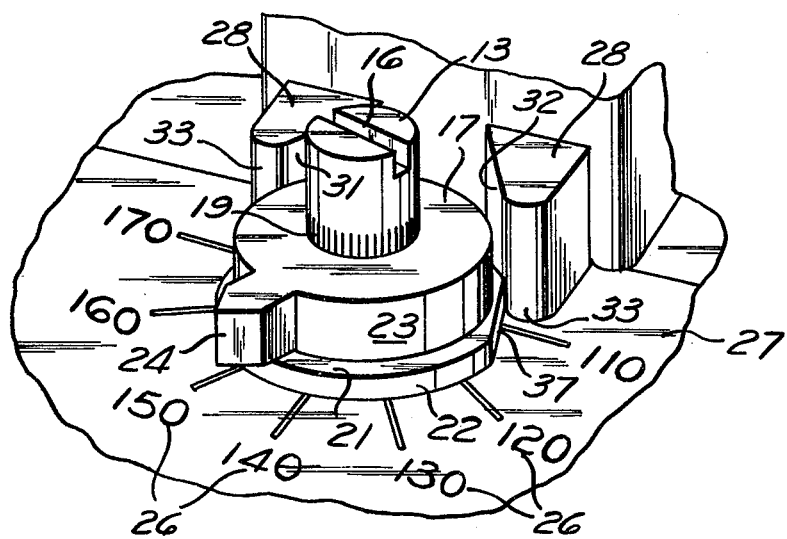

4,133,286

ADJUSTABLE THERMOSTAT

BACKGROUND OF THE INVENTION

This invention relates generally to adjustable thermostats and more particularly to adjustable thermostats incorporating an improved adjustment indicator or pointer having means to resist changes in the temperature setting of the thermostat.

PRIOR ART

Adjustable thermostats are normally provided with an indicator or pointer which provides a visual indication of the temperature setting of the thermostat. Examples of such thermostats are illustrated in the U.S. Pat. Nos. to Odson 3,442,129 issued May 6, 1969; and to Place 3,602,863 issued Aug. 31, 1971. Both of these patents are assigned to the assignee of the present invention.

Generally the manufacturer of an appliance or system, such as a water heater on which a thermostat is installed, specifies the temperature setting of the thermostat and the thermostat is set at such specified temperature during its manufacture.

In some instances, however, during the handling, shipping and use of the thermostat the adjusted temperature changes and the thermostat does not remain at the specified temperature setting. The Place patent mentioned above includes a wire clip which applies a frictional force to the adjusting stem to resist change of the temperature setting during shipping, handling and use of the device. In addition the Odson patent mentioned above discloses an adjustable thermostat having means to limit the range of adjustment to a range less than the full adjustment range of the thermostat by limiting the rotational travel of the indicator or pointer.

SUMMARY OF THE INVENTION

In the illustrated embodiment of the present invention a novel and improved adjustable thermostat structure is provided in which the adjustment indicator provides a deformable peripheral surface which engages a stationary surface on the body or case of the thermostat to provide friction resisting rotation of the adjusting stem. In addition, in the illustrated embodiment, a detent structure is provided which functions to provide a snap like action when the indicator is rotated to a predetermined temperature setting. Usually such detent structure is arranged to function at a temperature specified by the manufacturer of the system embodying the thermostat and is the recommended setting for the thermostat within the system. The illustrated structure completely eliminates the danger of accidental loss of the specified temperature adjustment setting during shipping, handling or use of the device.

BRIEF DESCRIPTION OF THE DRAWINGS

FIG. 1 is a plan view illustrating a typical thermostat incorporating the present invention with the temperature indicator in the detent position;

FIG. 2 is an enlarged fragmentary perspective view illustrating the temperature indicator in a position displaced from the detent position;

FIG. 3 is an enlarged plan view of the indicator element per se; and

FIG. 4 is a side elevation of the indicator element per se.

DETAILED DESCRIPTION OF THE DRAWINGS

The illustrated embodiment of this invention is applied to a thermostat of the type illustrated in the Place U.S. Pat. No. 3,602,863 referred to above. Such patent discloses the entire structural arrangement of the thermostat and is incorporated herein by reference.

Referring to the drawings, the thermostat includes a molded plastic body 10 preferably formed of a phenolic resin or the like and a metal cover 11 which includes means for mounting the thermostat. Switch means within the body 10 are connected to terminals 12 so that the thermostat can be wired to the system it controls.

An adjusting stem 13 is journaled in the body 10 for rotation about its axis 14. The upper end of the adjusting stem 13 is provided with a cross slot 16 best illustrated in FIG. 2 so that the adjusting stem can be easily rotated by a screwdriver or the like.

Mounted on the adjusting stem is an indicator or pointer 17 which is preferably molded from a deformable plastic material such as Nylon or the like. The indicator 17 is molded with a central aperture sized to receive the metal adjusting stem 13 with an interference fit. Preferably the surface of the adjusting stem 13 is knurled as illustrated at 19 to provide the surface of the stem 13 with a tooth like structure which bites into the surface of the indicator 17 and positively locks the indicator against rotation relative to the stem 13.

The indicator 17 in the illustrated embodiment is provided with a radially extending flange 21 adjacent to its lower surface which provides a peripheral surface 22 having a diameter greater than the diameter of the main cylindrical portion 23 of the indicator 17. The indicator 17 is also formed with a radially extending pointer portion 24 which is aligned during calibration of the thermostat with the appropriate indicia 26 printed on a plate 27 secured to the body 10 to provide a visual indication of the temperature setting of the thermostat. In FIG. 1 the thermostat is illustrated as set to operate at 140° F. In FIG. 2 the temperature setting of the thermostat is 150°. In the illustrated embodiment the thermostat can be adjusted from about 110° F. to 170° F. by rotation of the adjusting stem 13 and indicator 17.

The body 10 of the thermostat is provided with two wedge shaped projections 28 which are of uniform section in a direction parallel to the axis 14 of the adjusting stem 13. The two projections 28 provide similar but opposite planar surfaces 31 and 32 which are symmetrically positioned with respect to the axis 14 and are angulated with respect to each other with an included angle of about 60°.

The two planar surfaces 31 and 32 extend past a point of closest proximity to the axis 14 (a point at which a line perpendicular to the respective planar surfaces passes through the axis 14) to rounded extremities at 33. Therefore each surface 31 and 32 provide opposed surface portions which are inclined radially with respect to the axis 14.

The flange 21 is formed with two flatted portions 36 and 37 which are proportioned to closely fit and mate with the associated stationary planar surfaces 31 and 32 respectively on the body 10 when the indicator and, in turn, the adjusting stem 13 is rotated to a predetermined temperature setting. In the illustrated embodiment such temperature setting is 140° F. The remaining portions of the peripheral surface 22 of the flange 21 have a radius greater than the minimum spacing between the stationary planar surfaces 31 and 32 and the axis 14. The flats also each provide opposed portions which are inclined radially with respect to the axis 14 and mate with the two surfaces 31 and 32 to resist rotation from the detent position. When the indicator 17 is rotated in either direction from the 140° temperature setting, an interference is developed between the arcuate portions of the peripheral surface 22 and the two stationary surfaces 31 and 32 which creates deformation of the flange and creates substantial friction resisting such rotation. The indicator 17 is formed of a material such as Nylon which can be elastically deformed to allow such rotation.

The cooperation of the flats and the stationary planar surfaces, however, provides a detent-like function tending to cause the indicator to assume the 140° temperature setting and to retain such setting. Since the indicator can be rotated only 90° in either direction from the detent position the flats cannot move to a second detent position and the system provides only a single detent position.

As discussed above, in many instances the thermostat is installed in a system in which a specified temperature setting is established and the thermostat is set to such specified temperature during its manufacture. Preferably the specified temperature setting is the setting of the thermostat which exists when the detent functions. Consequently, there is substantially no possibility of accidental loss of the specified temperature setting during shipping, handling, or use of the thermostat. Further, the detent function provides means for the ultimate user of the system in which the thermostat is installed, to be aware of the preferred operating temperature, even though the user can adjust the thermostat to other operating temperatures within its range of temperature settings.

With the illustrated structure the frictional forces produced by the indicator's engagement with the thermostat body and the magnitude of the detent action can be varied within the design parameters of the device. For example, if greater frictional forces are required, the height of the flange can be increased, the radius of the flange can be increased or the indicator can be formed of harder material. Conversely, if lower frictional forces are required the height of the flange can be decreased, the radius of the flange can be decreased or the indicator can be formed of softer material.

The flats 36 and 37 in addition to providing the above discussed detent operation also facilitate the assembly of the indicator into its installed position since the flange 22 does not interfere with the ends of the projections 28 when properly aligned in the desired or specified temperature position.

Although a preferred embodiment of this invention is illustrated it is understood that various modifications and rearrangements may be resorted to without departing from the scope of the invention disclosed and claimed.

I claim:

1. A thermostat comprising a substantially rigid body, an adjusting stem journaled on said body for rotation about an axis to adjust the operating temperature of said thermostat, said body providing a fixed surface spaced from said axis, an indicator mounted on said stem for rotation therewith and providing a generally cylindrical radially extending portion formed of deformable material, said deformable material providing a deformable surface engaging said fixed surface and being deformed from its unstressed condition by such engagement, said engagement between said fixed surface and said deformable surface providing friction resisting rotation of said indicator and in turn said stem with respect to said body.

2. A thermostat as set forth in claim 1 wherein the fixed surface on said body is a planar surface and the deformable surface on said indicator is a substantially circular surface.

3. A thermostat as set forth in claim 1 wherein the fixed surface on said body is a planar surface substantially parallel to said axis, and the deformable surface on said indicator is a generally cylindrical surface, and said deformation of said deformable surface is substantially radial with respect to said axis.

4. A thermostat as set forth in claim 3 wherein said deformable surface includes planar portions which mate with said fixed surface of said body to provide detent means.

5. A thermostat as set forth in claim 4 wherein said peripheral surface is provided by a radially extending flange having a width in the direction of said axis less than the width of said indicator in the direction of said axis.

6. A thermostat comprising a substantially rigid body, an adjusting stem journaled on said body for rotation about an axis to adjust the operating temperature of said thermostat, said body providing a pair of projections symmetrically positioned with respect to said axis, an indicator mounted on said stem for rotation therewith and providing a generally cylindrical radially extending flange formed of radially deformable elastic material, said projections providing fixed surfaces spaced from said axis by a distance less than the radius of said flange when the material of said indicator is unstressed, said flange being formed with a pair of flats substantially constituting cords of the cylindrical flange which mate with associated of said fixed surfaces when said indicator stem is in one position, the deformability of said flange allowing rotation of said indicator from said one position for adjusting the operating temperature of said thermostat and producing frictional contact between the said fixed surfaces and deformable surfaces to resist rotation of said indicator stem.

7. A thermostat comprising a body, an adjusting stem journaled in said body, an indicator mounted on said stem for rotation therewith about an axis, rotation of said stem and indicator adjusting the operating temperature of said thermostat, said indicator being formed of deformable plastic material and providing a peripheral surface which is resiliently deformable in a radial direction, said body providing a stationary surface engaging a radially deforming said peripheral surface and producing friction resisting rotation of said indicator and stem with respect to said body.

8. A thermostat as set forth in claim 7 wherein said body provides similar and opposed stationary surfaces each of which engages said peripheral surface and produces friction resisting rotation of said indicator with respect to said body.

9. A thermostat as set forth in claim 5 wherein said peripheral surface includes a pair of flat portions operable to mate with an associated stationary surface and provide detent means tending to maintain said indicator in a predetermined position with respect to said body.

10. A thermostat as set forth in claim 9 wherein said indicator is molded Nylon.

11. A thermostat comprising a body, an adjusting stem journaled in said body, an indicator mounted on said stem for rotation therewith, rotation of said stem and indicator adjusting the operating temperature of said thermostat, said indicator being molded of elastically deformable material and providing a peripheral surface which is resiliently deformable in a radial direction and providing first opposed portions which are inclined in a radial direction, said body providing a stationary surface engaging said peripheral surface and having second surface portions which are inclined in a radial direction and mate with said first portions to resist rotation of said indicator and said stem when said indicator and stem are in a predetermined orientation with respect to said body, rotation of said indicator and stem from said predetermined orientation producing radial deformation of said peripheral surface and friction between said peripheral surface and said stationary surface resisting relative rotation of said indicator with respect to said body.

* * * * *